United States Patent Office 3,192,195
Patented June 29, 1965

---

3,192,195
AZOSTYRYL CATIONIC DYES
David Gordon Coe, Mendenhall, Pa., assignor to E. I. du Pont de Nemours and Company, Wilmington, Del., a corporation of Delaware
No Drawing. Filed Oct. 22, 1962, Ser. No. 232,312
4 Claims. (Cl. 260—156)

This case is a continuation-in-part of my copending application Serial No. 819,020, filed June 9, 1959, now abandoned.

This invention is directed to azostyryl dyestuff cations which are useful as dyes for acid-modified acrylic and polyester fibers and for union goods containing these fibers. Acid-modified acrylic fiber throughout this specification and claims means polyacrylic fiber having acid sites; for instance, the sulfonate modified acrylic fibers described in U.S. Patents 2,837,500 and 2,837,501. Acid-modified polyester, according to this invention, means polyethylene terephthalate fiber containing metal-sulfonate groups, as described more fully in Belgian Patent No. 549,179, granted July 14, 1957.

It is, therefore, an object of this invention to provide novel dyestuff cations for the purpose aforementioned, said cations being particularly characterized by being applicable to said fibers from an aqueous bath over a wide range of pH, say from 2 to 6, to give uniform yellow to brown dyeings that have exceptional fastness to light on both fibers.

These and other objects will become apparent from the following description and claims.

More specifically, the novel azostyryl cations of the present invention have the formula:

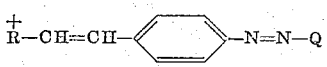

wherein Q is the group of a monocyclic phenol free of acid ionizing groups, and R is selected from the group of cations consisting of 1-methyl-2-pyridinium, 1-methyl-4-pyridinium and 5-ethyl-2-pyridinium.

Specific illustrations of coupling components adapted to supply the radical Q in the above formula are phenol, o-, m-, and p-cresol, methyl salicylate, 2,3-dimethylphenol, 2,4-dimethyl phenol, 2,5-dimethyl phenol, 2,6-dimethyl phenol, 3,4-dimethyl phenol, 3,5-dimethyl phenol, 2-chlorophenol, 3-chlorophenol and 4-chlorophenol.

It has been disclosed that cations of the aforegoing structure are significantly effective as dyes for acid-modified acrylic and polyester fibers, and produce thereon, from an aqueous bath, rapid dyeings fast to light and to washing.

These novel dyestuff cations give uniform results as to shade, through the unusually wide range of pH 2 to 6.

The novel dyestuff cations of this invention may be prepared by a number of different methods, of which the following two merit special consideration:

I. Forming the ethylene link first and then the azo bridge.
II. Forming the azo bridge first and then the ethylene link.

Procedure I is exemplified by the process starting with a p-acetamidostyryl heterocyclic nitrogen compound which is quaternized in the N-atom, for instance, 2-(p-acetamidostyryl)-1-methylpyridinium methosulfate, hydrolyzing the acetamido radical into an NH₂ group, diazotizing and coupling to an optical coupling component, for instance m-cresol in alkaline medium.

The initial material required in this process may itself be prepared by condensing para-acetamidobenzaldehyde with a quaternized heterocyclic nitrogen compound having a CH₃ group in position 2 or 4 with respect to the quaternary N-atom. For instance, p-acetamidobenzaldehyde may be condensed with the N-methyl methosulfate of 2-picoline or 4-picoline.

Procedure II is exemplified by a process starting with an azo benzaldehyde compound of formula

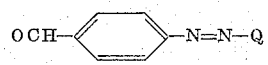

wherein Q has the same meaning as above, and condensing the same with a quaternized pyridine compound which has a CH₃ group in position 2 or 4 with respect to the N-atom. Such a process may be illustrated by the condensation of the azo compound

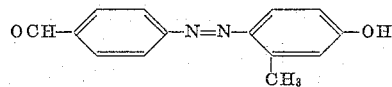

with 1-methyl-4-picolinium iodide.

The azo compound required as initial material in such a process may itself be prepared by diazotizing the corresponding p-amino-benzaldehyde, and coupling to an optional coupling component, for instance, m-cresol.

The dyestuff cations formed as described heretofore form salts with inorganic and organic anions, as for example, those of the hydrohalide acids, sulfuric and alkyl sulfonic acids, toluene sulfonic acids and perchloric acid; they may also be isolated as their hydroxides.

Without limiting this invention, the following representative examples are given to illustrate the preferred method of preparation. Parts mentioned are by weight.

EXAMPLE I

A solution of 10.95 parts of 2-(p-acetamidostyryl)-1-methylpyridinium methosulfate in 50 parts of water is treated with 11 parts of concentrated hydrochloric acid and heated at 90° to 100° C. for 2 hours. The resulting solution is diluted with 200 parts of ice water, diazotized with sodium nitrite in customary manner at 0° to 5° C., and coupled at 5° to 15° C. to 2.8 parts of phenol dissolved in 9 parts of 35% caustic soda diluted with ice and water. After one hour the mixture is acidified to pH 1 to 2 with 5 N hydrochloric acid and heated briefly to 60° C. On cooling, the precipitate is filtered off and dried. The resulting dry powder, which corresponds to the cation:

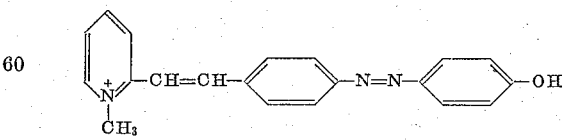

combined with a chloride anion, dyes polyacrylic and polyester fibers yellow shades of good fastness properties. The shade of the dyestuff cation does not change with a change in the acidity of the dye bath from pH 2 to pH 6.

In an analogous way, dyestuff cations with similar structure but varying colors were prepared by hydrolyzing, diazotizing, and coupling the following p-acetamidostyryl compounds with the accompanying hydroxy aromatic compounds.

| | Styryl nitrogen heterocycle intermediate | Coupling component | Color of dyeing |
|---|---|---|---|
| (a) | 2-(p-acetamidostyryl)-1-methyl-pyridinium methosulfate. | m-Cresol | Orange-yellow. |
| (b) | 2-(p-acetamidostyryl)-1-methyl-pyridinium methosulfate. | o-Cresol | Yellow. |
| (c) | 2-(p-acetamidostyryl)-1-methyl-pyridinium methosulfate. | p-Cresol | Orange-yellow. |
| (d) | 2-(p-acetamidostyryl)-1-methyl-pyridinium methosulfate. | 2,6-dimethylphenol | Do. |
| (e) | 2-(p-acetamidostyryl)-1-methyl-pyridinium methosulfate. | 3,5-dimethylphenol | Do. |
| (f) | 2-(p-acetamidostyryl)-5-ethyl-1-methyl-pyridinium methosulfate. | m-Cresol | Do. |
| (g) | 2-(p-acetamidostyryl)-1-methyl-pyridinium methosulfate. | Methyl salicylate | Yellow. |
| (h) | 2-(p-acetamidostyryl)-1-methyl-pyridinium methosulfate. | 2-chlorophenol | Orange. |
| (i) | 4-(p-acetamidostyryl)-1-methyl-pyridinium methosulfate. | m-Cresol | Orange-yellow. |
| (j) | 4-(p-acetamidostyryl)-1-methyl-pyridinium methosulfate. | Phenol | Yellow. |

The p-acetamidostyryl-N-methyl nitrogen heterocyclic methosulfate intermediate used as initial material in Example 1 was prepared by condensing p-acetamidobenzaldehyde with the appropriate dimethyl heterocyclic methosulfate, after the known manner of condensing p-acetamidobenzaldehyde with 1-methyl-2-picolinium iodide to prepare 2-(p-acetamidostyryl)-1-methylpyridinium iodide (Chemical Abstracts, vol. 47, col. 6404). A more particular example of the procedure is as follows:

108 parts of 1-methyl-4-picolinium methosulfate and 81 parts of p-acetamidobenzaldehyde are dissolved in 470 parts of ethyl alcohol and the mixture is heated to boiling under reflux. 10 parts of piperidine are added and the solution is refluxed for 18 hours. On cooling to room temperature, 115 parts of 4-(p-acetamidostyryl)-1-methylpyridinium methosulfate separate. Further quantities may be obtained by evaporating the mother liquor.

The novel dyestuff cations of this invention are useful for dyeing acid-modified acrylic and polyester fibers, or union fabrics containing these fibers in addition to wool. They may also be used successfully to dye pulp in the beater-engine stage of paper manufacture. In all these cases dyeings of outstanding fastness to light are obtained. This effect is particularly surprising, and unexpected, inasmuch as the presence of a —CH=CH— linkage makes the novel compounds of this invention related structurally to the cyanine dyes, which dyes are well known for their light sensitivity, and are in fact used extensively in the photographic arts. Consequently, fugitiveness rather than fastness to light was logically to be expected. Although the ability of cationic dyes to dye acid-modified acrylic and polyester fibers is well known in the art (see for example U.S.P. 2,893,816 and Belgian Patent No. 549,179) and it is further well known that many cationic azo dyes are characterized by having good light fastness on acid-modified acrylic fibers (see for example U.S.P. 2,893,816, U.S.P. 2,864,813, U.S.P. 2,821,526), there is one reference known in the art (French Patent No. 1,285,848) to indicate how to achieve light fast dyeings on acid-modified polyester fibers. Thus, the fastness of the novel series of dyestuff cations on both these fibers was hardly to be expected.

The novel dyes of this invention are also characterized by high tinctorial strength, brilliance of shade and wash fastness. Their application to acrylic or acid-modified polyester fibers may be made from an acid aqueous bath at about pH 2 to 6, at customary dyeing temperatures (180° to 212° F.). Application to union fabrics containing one of the above synthetic fibers and wool is carried out advantageously at 212° F. in a dye bath containing about 2% (by weight of the fiber) of glacial acetic acid, 2% of sodium acetate and 2% of a non-ionic surface active agent, such as Emulphor ON (a condensation product of oleyl alcohol with ethylene oxide).

By way of further illustration, the following two representative examples of the details of dyeing are given:

(1) *Dyeing of acrylic fiber*

100 parts of acrylic fiber as a woven fabric is pre-scoured at 70° C. for 15 minutes in 4000 parts of water and 1 part of a non-ionic dispersing agent. The fabric is rinsed and then boiled for two hours in a dye bath consisting of one part of glacial acetic acid, 0.25 part of the dye, 0.3 part of sodium acetate and 4000 parts of water. The fabric is then rinsed in warm water and scoured as before. Finally, the fabric is rinsed, dried and pressed.

(2) *Dyeing of polyester fiber*

To 300 parts water is added 0.2 part of the condensation product of 20 moles of ethylene oxide and one mole of oleyl alcohol, 0.6 part of a long-chain hydrocarbon sodium sulfonate and two parts of the sodium salt of o-phenylphenol. The pH is adjusted to 5.5 by adding 10% acetic acid. 0.025 part of dye and 10 parts of polyester staple fiber oil then added. Water is added to bring the dye bath volume to 400 parts, the dye bath heated to the boil and boiled for two hours. The fiber is rinsed in water, and scoured by beating for 30 minutes at 80° C. in an aqueous bath containing 0.5 gram per liter each of the following: NaOH, cetyl betaine and sodium hydrosulfite. The fiber is again rinsed in water and dried. This resulting dyed fiber is then heat-treated for one minute at 190° C.

The advantages of this invention will now be readily apparent. A novel series of dyestuff cations characterized by a novel, conjugated, chromophoric arrangement is provided, said cations having the practical value of producing light-fast dyeings on both acid-modified acrylic and polyester fibers. Uniform shade of the dyeings may be obtained with these novel compounds in the wide pH range of about two to six. Thus, mixtures of acid-modified acrylic fiber and acid-modified polyester fiber can be dyed light fast shades with a single dye and without close control of the dye bath pH.

The preceding representative Examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:
1. A cation of the formula

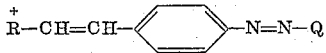

where Q is the radical of a monocyclic phenol selected from the group consisting of phenol, o-, m-, and p-cresols, 2,3-dimethyl phenol, 3,4-dimethyl phenol, 3,5-dimethyl phenol, 2,6-dimethyl phenol, 2,4-dimethyl phenol, 2,5-dimethyl phenol, 3-chlorophenol, 4-chlorophenol, 2-chlorophenol and methyl salicylate, R is the cationic radical of a quaternized heterocyclic compound selected from the group consisting of 1-methyl-2-pyridinium, 1-methyl-4-pyridinium and 5-ethyl-2-pyridinium.

2. A cation of the formula

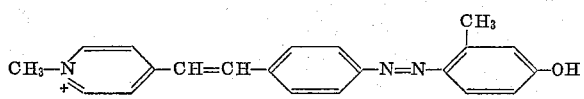

3. A cation of the formula

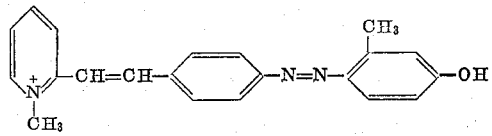

4. A cation of the formula

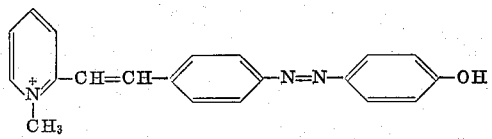

References Cited by the Examiner
UNITED STATES PATENTS

| | | | |
|---|---|---|---|
| 2,083,619 | 6/37 | Schirm | 260—156 X |
| 2,864,813 | 12/58 | Bossard et at. | 260—156 X |
| 2,893,816 | 7/59 | Tsang et al. | 260—157 X |

CHARLES B. PARKER, *Primary Examiner.*